Patented July 3, 1951

2,559,342

UNITED STATES PATENT OFFICE 2,559,342

ORGANO-SILICON COMPOSITIONS

Charles A. Burkhard, Alplaus, N. Y., assignor to General Electric Company, a corporation of New York No Drawing. Application July 26, 1949, Serial No. 106,958

8 Claims. (Cl. 260—448.8)

This invention is concerned with new compositions of matter. More particularly, the invention relates to compositions of matter corresponding to the general formula $R_nSi(OCH_2CH_2OR')_{4-n}$ where R is a monovalent hydrocarbon radical (either the same or different), R' is an alkyl radical containing from 1 to 2 carbon atoms (e. g., methyl and ethyl radicals), and $n$ is an integer equal to from 1 to 3, inclusive.

In the aforementioned formula, R may be, for example, the alkyl radical (e. g., methyl, ethyl, propyl, butyl, isobutyl, amyl, hexyl, 2-ethylhexyl, decyl, etc., radical), an aryl radical (e. g., phenyl, diphenyl, naphthyl, anthracyl, etc., radical), an alkaryl radical (e. g., tolyl, xylyl, ethylphenyl, etc., radical), an aralkyl radical (e. g., benzyl, phenylethyl, etc., radical), a cycloaliphatic radical (e. g., cyclopentyl, cyclohexyl, cyclohexenyl, cyclopentadienyl, etc., radical), an unsaturated aliphatic radical (e. g., vinyl, allyl, methallyl, ethinyl, butadienyl, etc., radical), etc. Preferably R is either the methyl or phenyl radical. It will, of course, be understood that R may be the same or different. Thus, there may be attached to the silicon atom by a carbon-silicon bond both a methyl and a phenyl radical or two methyl radicals and one phenyl radical, etc.

I am aware that the compound tetrakis-2-methoxy-ethoxysilane [$Si(OCH_2CH_2OCH_3)_4$] has been reported in the literature, specifically by Abrahamson et al. in J. Org. Chem. 13, 275 (1948) and Burkhard, J. Org. Chem. 13, 879 (1948). However, this reported compound differs from my claimed compositions in that there are no organic groups attached to the silicon atom by a carbon-silicon linkage. Because of this there are marked differences in the properties residing in the compound disclosed in the aforementioned references and in the compounds claimed in the instant application.

Generally, my claimed compositions may be prepared, for instance, by effecting reaction, preferably under the influence of heat between a halogenosilane corresponding to the general formula $R_nSiX_{4-n}$ and a monohydric alcohol having the formula $HOCH_2CH_2OR'$ where R, R' and $n$ have the meanings given above, and X is a halogen, for example, chlorine, bromine, etc.

In order that those skilled in the art may better understand how the present invention may be practiced, the following example is given by way of illustration and not by way of limitation. All parts are by weight.

EXAMPLE 1

The following chlorosilanes and 2-alkoxyethanols, the latter slightly in excess of that required to react with all the silicon-bonded chlorines, were heated at the reflux temperature of the mixture for from 3 to 8 hours until the evolution of HCl had ceased, and the products purified by rectification either in a column packed with stainless steel helices or in a Claisen flask to yield the compounds tabulated below in Table I.

Table I

| Compound No. | Chlorosilane | Molar Ratio | Alkoxy Ethanol | Molar Ratio | Compound Formed |
|---|---|---|---|---|---|
| 1 | Methyl trichlorosilane | 1 | Methoxyethanol | 4.0 | Methyl tris-2-methoxyethoxysilane. |
| 2 | Dimethyldichlorosilane | 1 | ___do___ | 2.6 | Dimethyl bis-2-methoxyethoxysilane. |
| 3 | Trimethylchlorosilane | 1 | ___do___ | 1.3 | Trimethyl-2-methoxyethoxysilane. |
| 4 | Methyl benzyldichlorosilane | 1 | ___do___ | 3.0 | Methyl benzyl bis-2-methoxyethoxysilane. |
| 5 | Methyl 2-pentyl-dichlorosilane | 1 | ___do___ | 3.0 | Methyl 2-pentyl bis-2-methoxyethoxysilane. |
| 6 | Penyltrichlorosilane | 1 | ___do___ | [1] 2.5 | Phenyl tris-2-methoxyethoxysilane. |
| 7 | Dimethyldichlorosilane | 1 | Ethoxyethanol | 3.0 | Dimethyl bis-2-ethoxyethoxysilane. |

[1] Because of the low ratio of methoxyethanol, a considerable quantity of phenyltrichlorosilane was removed.

The properties and results of analyses on the aforementioned compositions are found below in Table II.

Table II

| Compound No. | Boiling Point | $n_D^{20}$ | $d_4^{20}$ | Molar Refraction Calcd. | Molar Refraction Found | Analytical Calcd. C | Analytical Calcd. H | Analytical Found C | Analytical Found H |
|---|---|---|---|---|---|---|---|---|---|
| 1 | 145° C. (16 mm.) | 1.4200 | 1.0454 | 65.1 | 65.0 | 44.75 | 9.02 | 43.6 | 8.9 |
| 2 | 203–4° C. | 1.4114 | 0.9663 | 53.5 | 53.6 | 46.13 | 9.68 | 46.05 | 9.6 |
| 3 | 128° C. | 1.3952 | 0.8492 | 41.9 | 41.9 | 48.61 | 10.88 | 49.0 | 11.0 |
| 4 | 181–185° C. (15 mm.) | 1.4795 | 1.0141 | 77.5 | 79.6 | 59.12 | 8.51 | 59.1 | 8.7 |
| 5 | 146–152° C. (15 mm.) | 1.4298 | 0.9454 | 71.1 | 72.2 | 54.50 | 10.67 | 53.4 | 10.0 |
| 6 | 204° C. (15 mm.) | 1.4727 | 1.0818 | 84.1 | 85.6 | 54.52 | 7.93 | 54.0 | 8.1 |
| 7 | 136° C. (30 mm.) | 1.4131 | 0.9368 | 62.0 | 62.9 | 50.81 | 10.24 | 51.7 | 10.6 |

My claimed compositions are useful as intermediates in the preparation of organopolysiloxanes, e. g., resins, oils, etc. The latter may be formed by contacting my claimed compounds or mixtures thereof with either a base or an acid such as, for example, sodium hydroxide, potassium hydroxide, HCl, $H_2SO_4$, etc. They also have the unusual property of being miscible with water in varying degrees (some being miscible in all proportions with water), which sets these compounds apart from the usual hydrolyzable organosilanes containing a silicon-bonded alkoxy radical. In addition, the claimed compositions can be mixed with other hydroxy ethers such as methoxyethanol, and these mixtures are water-soluble within the limits of solubility of the least soluble component. Organopolysiloxanes can be obtained by hydrolysis of the aqueous solutions of these ethers merely by the addition of acidic or basic materials such as sodium hydroxide, HCl, etc., as well as $CO_2$, etc.

When aqueous solutions of the monomers are employed, it is possible to add only a very small per cent (e. g., from 0.1 to 1 per cent, by weight) of either acid or base to obtain hydrolysis of the claimed compounds whereby separation of the solution is accomplished to give an upper layer of the organopolysiloxane and a lower layer of the alkoxyethanol, water and hydrolysis catalyst. This two-phase system can be easily separated by decantation.

What I claim as new and desire to secure by Letters Patent is:

1. A composition of matter comprising a compound corresponding to the general formula $R_nSi(OCH_2CH_2OR')_{4-n}$ where R is a monovalent hydrocarbon radical, R' is an alkyl radical containing from 1 to 2 carbon atoms, and $n$ is an integer equal to from 1 to 3.

2. A composition of matter comprising an aqueous solution containing as the dissolved phase a compound corresponding to the general formula $R_nSi(OCH_2CH_2OR_2)_{4-n}$ where R is a monovalent hydrocarbon radical, R' is an alkyl radical containing from 1 to 2 carbon atoms, and $n$ is an integer equal to from 1 to 3.

3. Dimethyl bis-2-methoxyethoxysilane.
4. Phenyl tris-2-methoxyethoxysilane.
5. Dimethyl bis-2-ethoxyethoxysilane.
6. The method which comprises heating a mixture containing (1) a compound corresponding to the general formula $R_nSiX_{4-n}$ and (2) a monohydric alcohol corresponding to the formula $HOCH_2CH_2OR'$ where R is a monovalent hydrocarbon radical, X is a halogen, R' is an alkyl radical containing from 1 to 2 carbon atoms, and $n$ is an integer equal to from 1 to 3, inclusive, and isolating a compound corresponding to the general formula $R_nSi(OCH_2CH_2OR')_{4-n}$, where R, R' and $n$ have the meanings given above.
7. Methyl tris-2-methoxyethoxysilane.
8. Trimethyl-2-methoxyethoxysilane.

CHARLES A. BURKHARD.

REFERENCES CITED

The following references are of record in the file of this patent:

UNITED STATES PATENTS

| Number | Name | Date |
|---|---|---|
| 2,438,520 | Robie | Mar. 30, 1948 |
| 2,476,307 | Klein | July 19, 1949 |
| 2,481,349 | Robie | Sept. 6, 1949 |

OTHER REFERENCES

Burkhard, "Jour. Org. Chem.," vol. 3, Nov., 1948, pages 879–880.

Abrahamson et al., Jour. Org. Chem., vol. 13, March, 1948, pages 275–279.

Certificate of Correction

Patent No. 2,559,342                                              July 3, 1951

CHARLES A. BURKHARD

It is hereby certified that error appears in the printed specification of the above numbered patent requiring correction as follows:

Column 4, line 22, for that portion of the equation reading "$(OCH_2CH_2OR_2)$" read $(OCH_2CH_2OR')$;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*